Aug. 11, 1931.　　　　H. R. STUART　　　　1,818,437

METHOD OF AND APPARATUS FOR ELECTRIC REFRIGERATION

Filed June 28, 1926

INVENTOR.
Harve R. Stuart
BY
ATTORNEYS.

Patented Aug. 11, 1931

1,818,437

UNITED STATES PATENT OFFICE

HARVE R. STUART, OF SPRINGFIELD, OHIO

METHOD OF AND APPARATUS FOR ELECTRIC REFRIGERATION

Application filed June 28, 1926. Serial No. 118,871.

My invention relates to a method of and apparatus for electric refrigeration and the object of the invention is to secure refrigeration by the direct application of an electric current.

My invention consists in the method and apparatus hereinafter described and set forth in the claims. In carrying out my invention I make use of the principle that the joining together of certain metals having dissimilar thermo-electric power if supplied with electric energy under certain conditions will absorb heat at the junction point of the metals and dissipate heat at the point where the current is applied.

Figure 1:
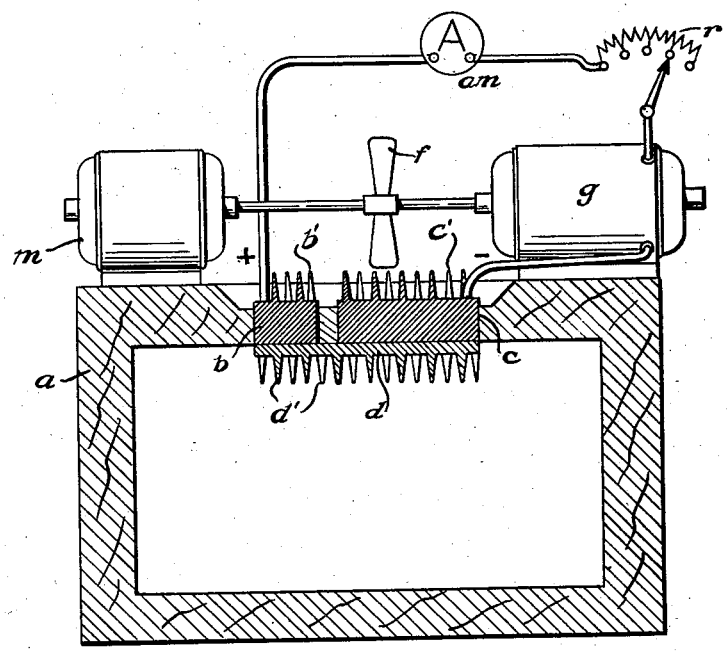
Fig. 1 is an elevation partly in section and more or less diagrammatic illustrating a simple application of the method and apparatus embodying my invention for refrigerating purposes.
Figure 3:
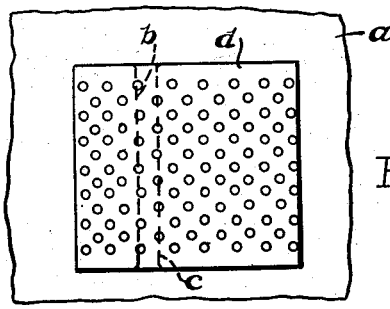
Fig. 3 is a bottom plan view of the thermoelectric element.

Similar letters of reference are employed in the respective views.

The apparatus illustrated in the drawings consists primarily of an insulated box $a$ which may be of any desired form or construction such as an ordinary refrigerator, and there is inserted in one wall of this insulating box or refrigerator two large pieces of dissimilar metals $b$ and $c$ which extend through the wall and form a part thereof. These dissimilar metals have dissimilar thermo-electric power or capacities, for instance the element $b$ may be of bismuth and the element $c$ of antimony. They are joined together on the interior of the box either directly or preferably by means of a different metal, for instance a plate of copper $d$. This connecting element $d$ is preferably provided with fins or projections $d'$ to assist in the absorbing of the heat within the box and the elements $b$ and $c$ are provided with similar projections $b'$ and $c'$ projecting on the outside of the box or refrigerator to assist in dissipating the heat. Means are provided for furnishing current to the elements $b$ and $c$, the positive terminal to be applied to the element having the lowest thermo-electric power or capacity, in this case the bismuth element $b$, and the negative pole being applied to the other element $c$.

As it is necessary to supply large quantities of direct current I have indicated a motor generator set, the motor $m$ of which may be supplied from any source of supply, for instance alternating current from a city line and the generator $g$ directly connected thereto is so constructed as to generate direct current of very low voltage and very high amperage.

To assist in dissipating the heat from the elements $b$ and $c$ there may be mounted directly on the motor shaft a fan $f$ to direct a current of air through or on to the elements $b$ and $c$ and to the projections $b'$ and $c'$. A rheostat $r$ and an ammeter $am$ may be provided in the circuit from the generator $g$ to the respective elements $b$ and $c$ joined together by the copper or other metal plate $d$ and as current flows through this circuit heat will be absorbed at the junction between the elements $b$ and $c$ or by the plate $d$ and will be dissipated at the opposite extremity of these elements $b$ and $c$ where it will pass into the atmosphere assisted by the cooling effect of the fan which directs the current of air on to the elements and through the fins or projections.

It is essential that the elements $b$ and $c$ be comparatively large and of low resistance to prevent ohmic heating which would counteract the cooling effect of the heat absorption at the junction of the two metals.

In operation a large current amperage of comparatively low voltage is transmitted to the element *b*, thence to plate *d* which forms the juncture between the elements *b* and *c*, to element *c* and thence to the source of electric supply. The juncture of the dissimilar metals by plate *d* which forms a part of the inner wall of the receptacle will absorb heat from the receptacle and dissipate it at the outer side of the unit which forms a part of the outer wall of the receptacle.

Figure 2:
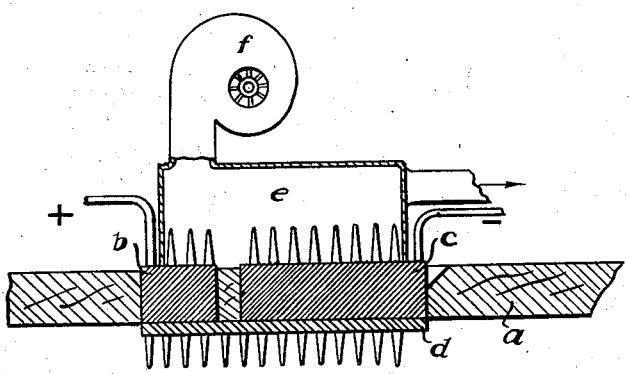
Fig. 2 is a similar view showing the refrigerating element and modifications in the application.

In Fig. 2 a slightly modified form of cooling device is shown in which the fan *f* is adapted to discharge in a chamber *e* surrounding the hot side of the elements *b* and *c*.

It is obvious that the construction may be modified to suit various conditions and it is also obvious that various different kinds of metal may be employed for the refrigerating element, the use of bismuth and antimony being illustrative only. Obviously elements which when joined together will have as high thermo-electric capacities as possible will be the most successful and efficient in operation.

Having thus described my invention, I claim:

1. A thermo-electric element for refrigerating purposes consisting of two dissimilar metals of low resistance, with means comprising an electric and heat conducting plate at one side for absorbing heat and projections at the other side for dissipating heat, and a source of direct electric current of low voltage and high amperage, the positive pole of said current being supplied to the metal having the lowest thermo-electric capacity and the negative pole to the one having the highest thermo-electric capacity.

2. The combination, with a refrigerator box of a thermo-electric unit consisting of dissimilar metals joined together by an electric and heat conducting plate on the inside of said refrigerator box, a source of direct current of high amperage and low voltage connected to the respective elements of dissimilar thermo-electric capacities, and cooling means applied to the exposed side of said metal outside of said refrigerator box.

3. A thermo-electric element for refrigerating devices consisting of two dissimilar metals of low resistance with means at one side for absorbing heat and at the other side for dissipating heat, said element being of a size and shape to form a portion of the wall of the refrigerating receptacle with the cold side of said element forming part of the inner wall and the hot side a part of the outer wall of said receptacle, and a source of electric current the respective terminals of which are connected to the respective metals with the positive connection to the metal having the lowest thermo-electric capacity.

4. An electric refrigerator comprising a chamber, a thermo-electric element located in and forming a part of a wall of said chamber, an electric and heat conducting plate in said chamber forming a connection between the different metals of said element, a motor generator on the outside of said chamber, electrical connections from said generator to said thermo-electric element, and a fan connected with said motor for cooling the outer wall of said element.

In testimony whereof, I have hereunto set my hand this twenty-sixth day of June 1926.

HARVE R. STUART.